April 12, 1966     J. A. KUECKEN     3,246,322

DISTANCE MEASURING EQUIPMENT

Filed Oct. 23, 1964

INVENTOR.
JOHN A. KUECKEN.
BY Alden D. Redfield
Irwin P. Garfinkle
ATTORNEYS.

United States Patent Office 3,246,322
Patented Apr. 12, 1966

3,246,322
DISTANCE MEASURING EQUIPMENT
John A. Kuecken, Cincinnati, Ohio, assignor to Avco Corporation, Cincinnati, Ohio, a corporation of Delaware
Filed Oct. 23, 1964, Ser. No. 407,276
4 Claims. (Cl. 343—6)

This is a continuation-in-part of application Serial No. 811,316 filed May 6, 1959, now abandoned.

This invention relates in general to apparatus for measuring the distance, and in particular to a system of distance measurement, wherein a moving target is capable of determining its own slant range from a fixed station by means of apparatus on the target which is entirely passive.

The distance measuring equipment provided by this invention consists of a fixed ground station having a radar transmitter and receiver, the transmitter having a highly variable modulation frequency. The transmitter is provided with a highly directive antenna which is continuously scanned through a given sector, which may be 360°. Electromagnetic energy signals generated by the transmitter and impinging on an aircraft target are reflected back to the ground station receiver, and the delay between transmission and reception of a signal at the ground station provides a measure of range of the target. In accordance with this invention, in the absence of a target the transmitter transmits signal energy modulated at a given rate or frequency determined by the established parameters of the circuitry. In the presence of a target, the reflected signal or echo is used to control the modulation rate or frequency of the transmitted signal. Each target aircraft is provided with a receiver having means for measuring the modulation frequency. Knowing the modulation rate or frequency, and using entirely passive apparatus, each target aircraft is able independently to determine its own range from the ground station, which may be entirely unattended.

It is an object of this invention to provide a system of distance measurement whereby a moving target is able to determine its range from a ground station by means of apparatus which is entirely passive.

Another object of this invention is to provide a radar arranged in such a manner that its modulation frequency is a direct function of the round-trip time of travel of a transmitted signal to a target and whose frequency, as determined at the target, is a measure of target range.

Still another object of this invention is to provide a radar having a pulse repetition rate which is a direct function of the round-trip time of travel of a transmitted pulse to a target, and means at the target for determining the pulse repetition rate, said rate being a function of range of said target from said radar.

Another object of this invention is to provide a frequency-modulated or amplitude-modulated continuous wave radar, the frequency of the signal modulations of the transmitted wave from said radar being a direct function of the round-trip time of travel of a transmitted wave to a target, and means at the target for measuring the frequency of said modulations, said frequency being a function of range of said target from said radar.

For further objects and for a more complete understanding of the nature of this invention, reference should now be made to the following detailed description and to the accompanying drawings, in which.

Figure 1:
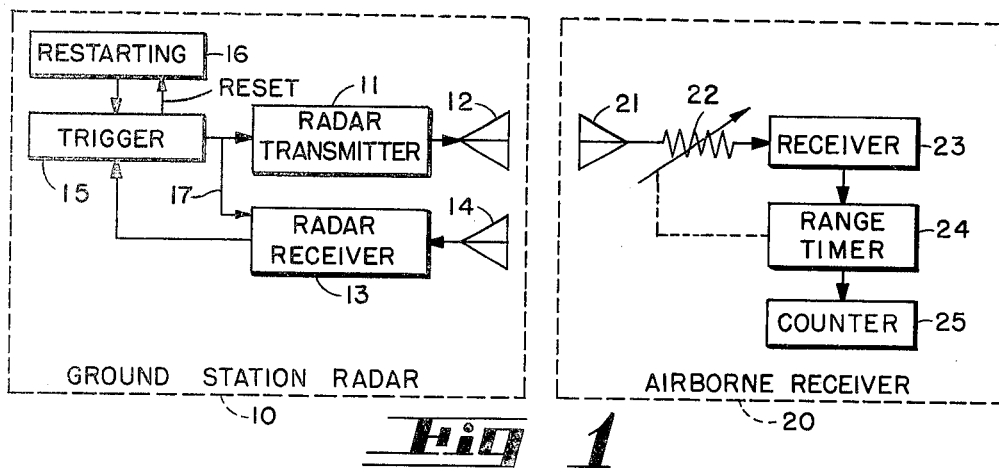
FIGURE 1 is an embodiment of my invention illustrating distance measuring apparatus including a passive airborne receiver and a ground station radar having a highly variable pulse repetition rate.

Referring to FIGURE 1 of the drawings, the distance measuring equipment which embodies this invention is illustrated as including a ground station radar 10 which normally is installed at an airport or other control station. In addition, each aircraft is provided with a passive airborne equipment 20.

The ground station radar 10 comprises a conventional pulse-modulated radar transmitter 11 for generating pulses of electromagnetic energy which are directed toward a target in space by means of a highly directional antenna 12. The ground station radar 10 also includes a radar receiver 13 provided with a similar directional antenna 14 for picking up any waves reflected by the target. It is to be understood, of course, that a single antenna used in conjunction with a conventional T–R box may also be used and is considered to be an equivalent arrangement. In accordance with this invention, the radar transmitter 11 is arranged to generate signal pulses only upon the occurrence of a trigger voltage from the output circuit of the trigger circuitry 15.

The trigger circuitry 15 is rendered operative in one of two ways. Restarting circuitry 16 is provided for producing an output voltage which initiates operation of the trigger circuitry 15 when the apparatus is first turned on. The trigger circuitry, in turn, initiates the generation of a pulse or a series of pulses from the radar transmitter 11 and the antenna 12. In the event a transmitter pulse strikes no target, then after a predetermined time delay, the restarting circuitry 16 will again initiate operation of the trigger circuitry 15. Thus, in the absence of a target, the transmitter operates at a rate determined by system parameters. On the other hand, if a transmitted pulse strikes a target, then the target echo is reflected back towards the antenna 14 and the output of the receiver 13 is used to reinitiate operation of the trigger circuitry 15. Operation of the trigger circuitry 15 automatically serves to reset the restarting circuitry at zero time to initiate another transmission.

It will be recognized that if the transmitted waves strike a target, the time between the first and succeeding trigger pulses from the trigger circuitry 15 will be dependent on the round-trip time of a transmitted pulse and, hence, the pulse repetition rate of the transmitter is then a direct function of range to a given target. That is to say, as a target range increases or decreases, the time between successive pulses generated by the radar transmitter 11 is increased or decreased, thus varying the pulse repetition rate.

The passive airborne equipment 20 mounted on each target includes an omnidirectional antenna 21, an attenuating circuit 22, a receiver 23, a range timer 24 and a counter 25. The receiver 23 is entirely conventional and is arranged to amplify received pulses generated by the radar transmitter 11. The output of the receiver is applied to the range timer 24, the function of which is to automatically control the attenuation of signals picked up by the antenna 21. That is to say, at close ranges the signals picked up at antenna 21 may too strong for receiver sensitivity, and the range timer 24 is used to increase the impedance of attenuator 22, thus running down the sensitivity at close ranges and preventing spurious displays. Similarly, at long range the amount of attenuation is automatically decreased. The counter is entirely conventional and is merely a device for precisely determining the pulse repetition rate of the received radar signals. The pulse repetition rate is a direct function of range which may be determined by the equation:

$$t = 2R/V$$

where $V$ = Velocity of propagation of the wave;
$R$ = Range of the target from the ground station; and
$t$ = The interval between successive pulses.

Thus, an operator on an aircraft, with simple and inexpensive apparatus, can determine his own range by "listening in" on the signals generated by the ground station radar transmitter in response to his own echoes. This system is highly advantageous for modern airports since it requires only one radar transmitter and receiver which is located in the airport, while the aircraft is required to have a relatively insensitive and inexpensive receiver and pulse counter.

The system is intended for use in the vicinity of an airport where each of any number of aircraft may determine its own range, and only its own range, by monitoring the transmitter. The transmitter may be completely unattended, and for airport use might sweep a 360° sector. In the absence of any target, the transmitter would run at a modulation rate consistent with the established circuit parameters representing a chosen range gate. However, upon the receipt of a reflected wave, the operating characteristics of the transmitter are changed to establish a new modulation rate. Only the aircraft from which the waves are reflected will receive any signal, and that signal will be at the rate representing the range of that aircraft. By having a counter on the aircraft calibrated to read the rate in terms of range, the aircraft can determine its own range by simply reading the counter. As the sweep of the transmitted beam leaves the aircraft, and in the ordinary case there would likely be no more than 10 to 12 "hits" per scan, the transmitter will return to its normal rate until another aircraft is struck with a transmitted pulse.

It is to be understood that in the embodiment of FIGURE 1, as shown, the radar equipment is provided with S.T.C. (sensitivity time control) circuitry, and a portion of the output from the trigger circuit applied through a line 17 to the radar receiver 13 is used for this purpose. Without such circuitry there is the possibility that the radar transmitter will be jammed or caused to fire spuriously in the event that two or more targets at different ranges are scanned simultaneously. As is known in the art, S.T.C. circuitry greatly reduces the sensitivity of the receiver immediately following the transmission of a wave form, but increases the sensitivity of the receiver with time. Thus, with the use of such circuitry in the embodiment illustrated in FIGURE 1, the echo from a first target would cause the generation of a pulse, and the sensitivity of the receiver would be immediately reduced to the extent that the receiver would be insensitive to any succeeding echoes from other targets.

Figure 2:
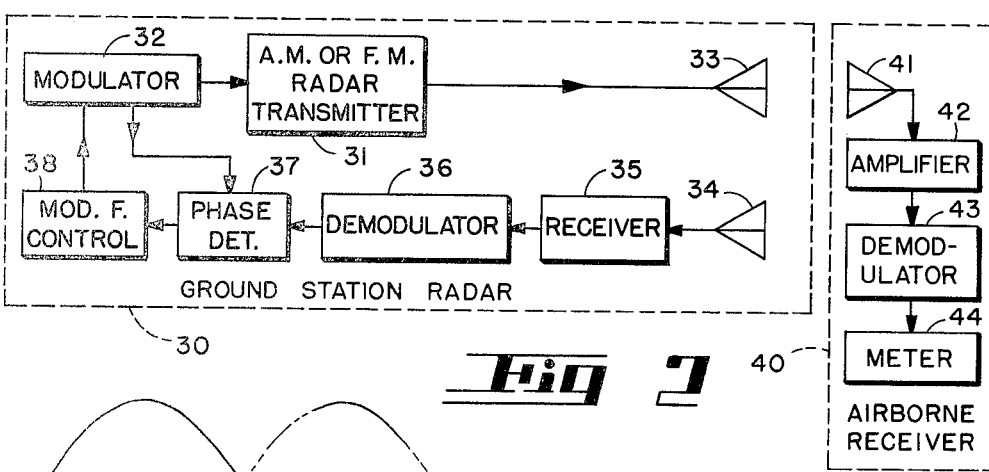
FIGURE 2 is a modification of my invention illustrating a ground station radar which is frequency or amplitude modulated.

The modification of my invention illustrated in FIGURE 2 differs from that of FIGURE 1 in that the radar transmitter is frequency or amplitude-modulated rather than pulse-modulated. In FIGURE 2 the apparatus comprises a fixed ground station radar 30 including a radar transmitter 31 for generating a continuous wave which is AM or FM modulated by means of a modulator 32. The output of transmitter 31 is radiated into space by means of a highly directional antenna 33. As in usual radars, reflected target echoes are picked up at a similar antenna 34 and applied to a receiver 35, the output of which is demodulated in a demodulator 36.

Now it will be recognized that with either frequency or amplitude modulation, the signal modulation of the echo will be out of phase with the signal modulation of the transmitted wave by an amount which is a function of the round-trip time of travel of the wave. Using a conventional phase detector 37 and applying to it the output of both the demodulator 36 and the modulator 32, a direct voltage which is a function of the time delay (range) may be derived. The output of phase detector 37 is then applied to a conventional modulation frequency control circuit 38 which controls the modulation frequency of the modulator 32. The modulation frequency control circuit may comprise, for example, a conventional diode reactance or any other device having characteristics such that its reactive impedance varies with applied voltage. By connecting such a device in the tuning circuits of the modulator 32, the frequency of the modulator is varied within precise limits.

The airborne equipment 40 comprises an omnidirectional antenna 41, an amplifier 42, a conventional demodulator 43 and a meter 44 for accurately determining the frequency of the demoulated signals. The apparatus may also include a range timer or other system of automatic gain control, but for the sake of simplicity this feature is not illustrated in this embodiment. Depending upon the nature of the modulations, amplitude or frequency, a conventional diode detector or Foster-Seeley discriminator may be used as the demodulator 43.

Figure 3A:
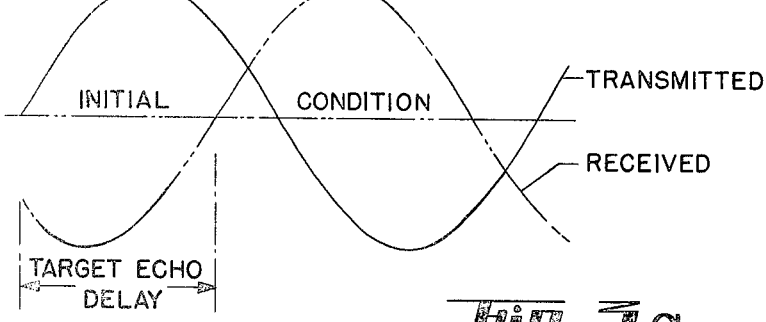
FIGURES 3a and 3b are curves illustrating the operation of the apparatus illustrated in FIGURE 2.
Figure 3B:
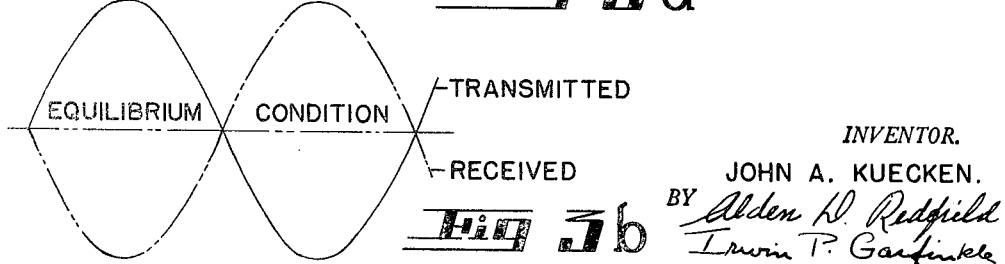

In operation, a frequency or amplitude-modulated wave is generated by the transmitter 31 and radiated into space by the antenna 33. If the waves strike a target, the target echo is reflected back to the antenna 34. As illustrated in FIGURE 3a, the modulation wave forms of the generated and reflected waves will be out of phase an amount dependent upon the round-trip time of travel of the signals; i.e., range of the target from the ground station. By comparing the phase of the modulator output with the phase of the demodulated reflected signals, a direct voltage output is produced from the phase detector 37 which is a direct function of the time delay or range. The phase detector output is applied to the frequency control circuit 38, thereby changing the frequency output of the modulator 32 until the signal modulations of the transmitted and received waves are 180° out of phase, as illustrated in FIGURE 3b. At this time the output from the phase detector is zero and no further control is exercised on the modulator 32.

The modulation signal frequency generated at transmitter 31 and received at the target antenna 41 may be used as a measure of range. For this purpose the modulation frequency of the received signals is detected by the demodulator 43 and measured by the meter 44 and, thus, as in the first embodiment, an operator on the target aircraft is able to determine his precise range to the ground station by simply "listening" to the transmitted signals and measuring the frequency of the received modulation wave forms. The meter 44 may be calibrated to give direct range readings. In this embodiment use may be made of automatic gain control techniques in the ground station radar receiver 35 to prevent the readings from a second, more distant target at the same azimuth and elevation angles.

It will be recognized that if, in each of the embodiments disclosed, the transmitting antennas are made highly directional, and if the airborne receiver is made relatively insensitive, it will then be possible for many target aircrafts in the vicinity of the ground station to derive slant range information from the ground station. That is to say, with a highly directive transmitted beam and with a relatively insensitive airborne receiver, only one's own range will be indicated on the meter. For use in an airport, the transmitting and receiving antennas on the ground station are arranged to scan a predetermined sector in space and are preferably arranged for transmitting a stacked beam in a controlled cylindrical or conical pattern.

Many modifications and adaptations will become readily apparent to persons skilled in the art. It is intended, therefore, that this invention be limited only by the appended claims as interpreted in the light of the prior art.

What is claimed is:

1. In a system wherein each of any number of passive targets may independently determine its own range from a single active station, the combination comprising:

a transmitter and a receiver at said station;

said transmitter at said station including a source of electromagnetic energy modulated at a given rate, and a directive antenna for radiating said modulated electromagnetic energy into space, said directive antenna being continuously scanned through a given sector;

said receiver at said station including means in response to reception of reflected electromagnetic energy for varying the modulation rate of said source, the variation in said rate being a function of the round-trip time of travel of said electromagnetic energy from said antenna to a reflecting target;

each of said targets including a receiver for receiving said transmitted waves of electromagnetic energy and additional means at said target for determining said modulation rate, said rate representing the range of said target from said ground station;

each of said targets receiving said transmitted energy only when scanned by said energy, and said transmitter responding independently and successively to each aircraft scanned.

2. In a system wherein each of any number of passive targets may independently determine its own range from a single active station, the combination comprising:

a transmitter and a receiver at said station;

said transmitter at said station including a source of electromagnetic energy, means for pulse modulating said source of electromagnetic energy at a given rate, and a directive antenna for radiating said pulse modulated electromagnetic energy into space, said directive antenna being continuously scanned through a given sector;

said receiver at said station including means in response to reception of a reflected pulse of radiated electromagnetic energy received at said receiver for varying said given rate as a function of the round-trip travel time of said electromagnetic energy from said antenna to a reflecting target;

each of said targets including a receiver for receiving said transmitted waves of electromagnetic energy, and additional means at said target for determining said pulse repetition rate of the modulations of said radiated energy, said rate representing the range of said target from said ground station;

each of said targets receiving said transmitted energy only when scanned by said energy, and said transmitter responding independently and successively to each aircraft scanned.

3. The invention as defined in claim 2 wherein said receiver has characteristics such that its sensitivity is reduced at the instant of transmission of each pulse and increases in sensitivity thereafter as a function of time.

4. In a system wherein each of any number of passive targets may independently determine its own range from a single active station, the combination comprising:

a transmitter and a receiver at said station;

said transmitter at said station including a source of electromagnetic energy, a trigger circuit for developing output pulses, said trigger circuit normaly developing output pulses at a given rate, said rate being adjustable in response to control voltage pulses, said output pulses from said trigger circuit pulse modulating said source of electromagnetic energy, and a directive antenna for radiating said pulse modulated electromagnetic energy into space, said directive antenna being continuously scanned through a given sector;

said receiver at said station including means for developing a control voltage pulse in response to reception of each reflected pulse of radiated electromagnetic energy received at said receiver, each control voltage pulse serving to develop an output pulse from said trigger circuit, whereby the interval between output pulses is then the round-trip travel time of said electromagnetic energy from said antenna to a reflecting target, said receiver having characteristics such that its sensitivity is reduced at the instant of transmission of each pulse and increases in sensitivity thereafter as a function of time;

each of said targets including a receiver for receiving said transmitted waves of electromagnetic energy, and additional means at said target for determining said pulse repetition rate of the modulations of said radiated energy, said rate representing the range of said target from said ground station;

each of said targets receiving said transmitted energy only when scanned by said energy, and said transmitter responding independently and successively to each aircraft scanned.

References Cited by the Examiner

UNITED STATES PATENTS

| 2,419,541 | 4/1947 | De Rosa | 343—13 |
| 2,467,299 | 4/1949 | Espenschied | 343—7.5 X |
| 2,495,690 | 1/1950 | Bradley | 343—7.5 |
| 2,513,478 | 7/1950 | Gutton | 343—7.5 |
| 2,529,510 | 11/1950 | Manley | 243—7.5 |

CHESTER L. JUSTUS, *Primary Examiner.*

P. M. HINDERSTEIN, *Assistant Examiner.*